US012399658B2

United States Patent
Gupta et al.

(10) Patent No.: US 12,399,658 B2
(45) Date of Patent: Aug. 26, 2025

(54) DETERMINING A STORAGE DEVICE TYPE ON WHICH TO STORE EXTENTS OF DATA IN A STORAGE SYSTEM

(71) Applicant: INTERNATIONAL BUSINESS MACHINES CORPORATION, Armonk, NY (US)

(72) Inventors: Lokesh Mohan Gupta, Tucson, AZ (US); Matthew G. Borlick, Tucson, AZ (US); Beth Ann Peterson, Tucson, AZ (US); Clint A. Hardy, Tucson, AZ (US); Karl Allen Nielsen, Tucson, AZ (US)

(73) Assignee: International Business Machines Corporation, Armonk, CA (US)

( * ) Notice: Subject to any disclaimer, the term of this patent is extended or adjusted under 35 U.S.C. 154(b) by 0 days.

(21) Appl. No.: 18/480,843

(22) Filed: Oct. 4, 2023

(65) Prior Publication Data
US 2025/0117165 A1    Apr. 10, 2025

(51) Int. Cl.
*G06F 3/06* (2006.01)
(52) U.S. Cl.
CPC ............ *G06F 3/0689* (2013.01); *G06F 3/061* (2013.01); *G06F 3/0647* (2013.01); *G06F 3/068* (2013.01)
(58) Field of Classification Search
CPC ........... G06F 3/061; G06F 3/0647–065; G06F 3/068; G06F 3/0689
See application file for complete search history.

(56) References Cited

U.S. PATENT DOCUMENTS

| | | | |
|---|---|---|---|
| 5,237,460 A | 8/1993 | Miller et al. |
| 5,893,139 A | 4/1999 | Kamiyama |
| 9,965,394 B2 | 5/2018 | Romanovskiy |
| 10,481,806 B2 | 11/2019 | Mehrotra et al. |
| 10,586,007 B1 | 3/2020 | Bigman |
| 10,810,054 B1 | 10/2020 | Martinez Lerin |
| 10,860,257 B2 | 12/2020 | Sakurada et al. |

(Continued)

FOREIGN PATENT DOCUMENTS

EP        0720085 A2    7/1996

OTHER PUBLICATIONS

"Partial Chip Access with Data Compression for Energy Saving and Performance Improvement," IP.com, IP.com No. IPCOM000266717D, Aug. 12, 2021, 16 pp.

(Continued)

*Primary Examiner* — Chie Yew
(74) *Attorney, Agent, or Firm* — Konrad, Raynes, Davda & Victor LLP; David Victor (57) ABSTRACT

Provided are a computer program product, system, and method for determining a storage device type on which to store extents of data in a storage system. The storage system provides a first storage device type that has native data compression at a first compression ratio and a second storage device type that has native data compression at a second compression ratio. The second compression ratio is higher than the first compression ratio. A determination is made for an extent to store the extent on the first storage device type or the second storage device type based on access frequency to data in the extent and an Input/Output (I/O) priority level for the extent. The extent is stored on the determined first or second storage device type.

20 Claims, 7 Drawing Sheets

(56) References Cited

U.S. PATENT DOCUMENTS

| | | |
|---|---|---|
| 11,561,695 B1 | 1/2023 | Guyer |
| 2007/0196101 A1 | 8/2007 | Maeda |
| 2014/0317340 A1 | 10/2014 | Nishina et al. |
| 2016/0259565 A1 | 9/2016 | Hendry et al. |
| 2016/0291876 A1 | 10/2016 | Alatorre et al. |
| 2017/0039000 A1 | 2/2017 | Feng et al. |
| 2017/0090775 A1* | 3/2017 | Kowles .................. G06F 3/0608 |
| 2020/0192571 A1* | 6/2020 | Thrane .................. G06F 3/0685 |
| 2021/0103399 A1 | 4/2021 | Lyu et al. |
| 2021/0117132 A1* | 4/2021 | Vankamamidi ....... G06F 3/0688 |
| 2023/0418468 A1* | 12/2023 | Shah ..................... G06F 3/0604 |
| 2025/0117149 A1 | 4/2025 | Hardy et al. |

OTHER PUBLICATIONS

Pawar, et al., "Method to Achieve Significant Storage Efficiency without Affecting Performance," IP.com, IP.com No. IPCOM000266565D, IJul. 29, 2021, 4 pp.
U.S. Appl. No. 18/480,834, filed Oct. 4, 2023.
List of Patents or Patent Applications Treated as Related, 2 pp., dated Oct. 4, 2023.
United States Non-Final Rejection dated Sep. 23, 2024, 18 pages, in U.S. Appl. No. 18/480,834.
United States Final Rejection dated Feb. 25, 2025, 21 pages, in U.S. Appl. No. 18/480,834.
United States Non-Final Rejection dated May 20, 2025, 07 pages, in U.S. Appl. No. 18/480,834.

* cited by examiner

FIG. 1

Compression Score Information

FIG. 2

Storage Device Type Compression Information

FIG. 3

Extent Information

DETERMINING A STORAGE DEVICE TYPE ON WHICH TO STORE EXTENTS OF DATA IN A STORAGE SYSTEM

BACKGROUND OF THE INVENTION

1. Field of the Invention

The present invention relates to a computer program product, system, and method for determining a storage device type on which to store extents of data in a storage system.

2. Description of the Related Art

A storage system consists of numerous storage devices configured in an array to represent a single combined storage space, such as a group of numerous storage devices in a Redundant Array of Independent Disks (RAID) array or a Just a Bunch of Disks (JBOD) array. A storage system may be comprised of heterogeneous storage devices having different capabilities. An enterprise storage system that supports heterogeneous storage drives of different capabilities can select among the drives to store data to optimize for bandwidth and latency.

SUMMARY

Provided are a computer program product, system, and method for determining a storage device type on which to store extents of data in a storage system. The storage system provides a first storage device type that has native data compression at a first compression ratio and a second storage device type that has native data compression at a second compression ratio. The second compression ratio is higher than the first compression ratio. A determination is made for an extent to store the extent on the first storage device type or the second storage device type based on access frequency to data in the extent and an Input/Output (I/O) priority level for the extent. The extent is stored on the determined first or second storage device type.

DETAILED DESCRIPTION

A storage system comprised of an array of storage devices may have storage devices implementing different native compression algorithms to provide different compression ratios. Further, the storage pool of storage devices to use to store data may be comprised of storage devices that have compression capability and other storage devices that do not offer compression. Further, storage devices may utilize compression algorithms that have different performance profiles. For instance, an algorithm implemented in a storage device that compresses and decompresses data at a slower rate may have a better compression ratio and higher performance, whereas an algorithm that compresses/decompresses data faster may have a lower compression ratio but higher performance.

Described embodiments provide improvements to computer technology to determine a storage device type of storage devices on which to store a particular extent of data in a volume based on the particular Input/Output (I/O) profile of the extent and the compression capabilities of the storage device types to select a storage device type that is optimal for storing an extent given that extent's I/O profile. Attributes of both the extent I/O profile and the storage device type, such as compression ratio and free space, may be considered to match the appropriate storage device type, such as low compression/high performance or high compression/low performance, to an extent, considering frequency of access of data in the extent and I/O priority of the extent.

Figure 1:
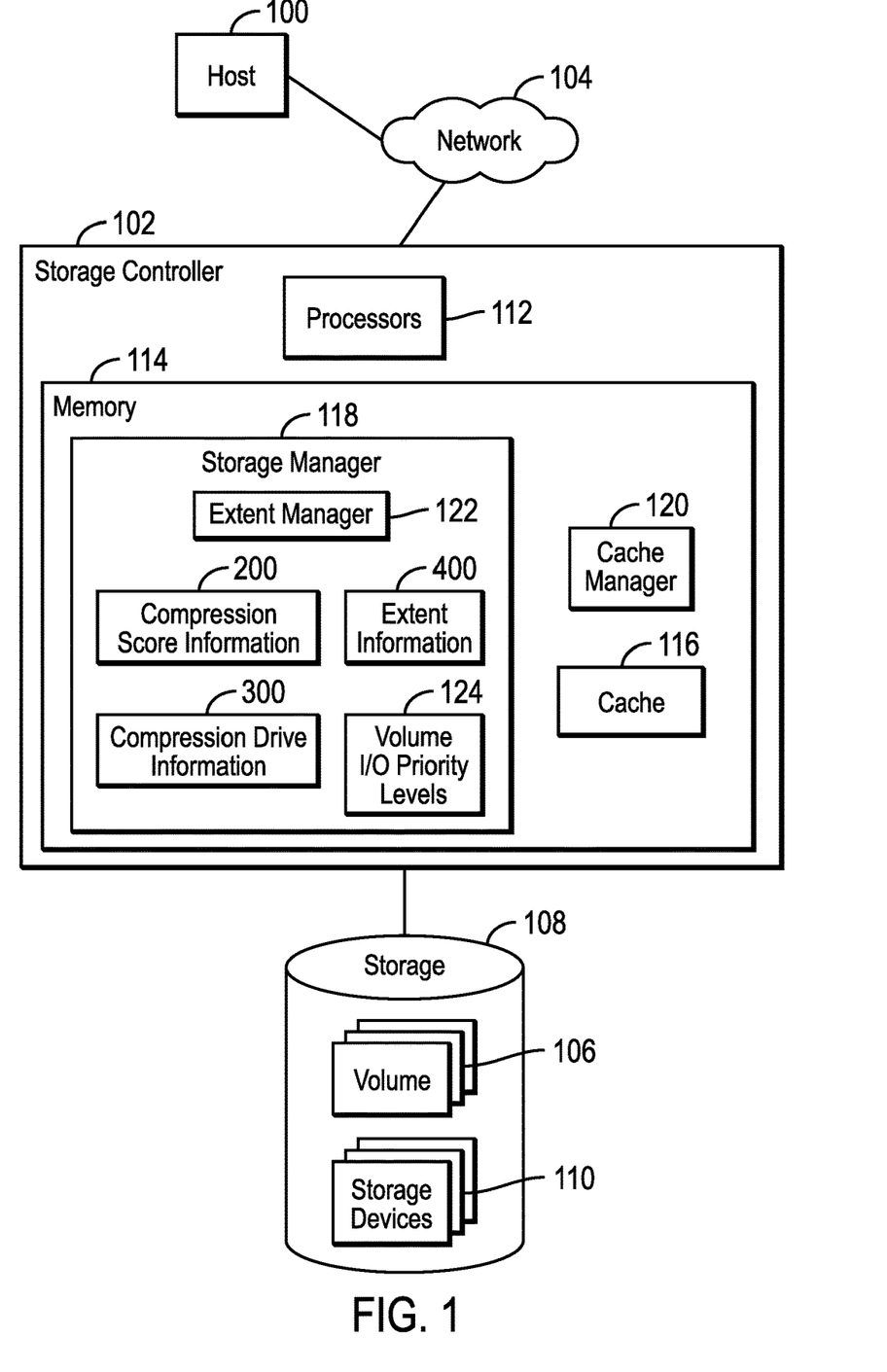
FIG. 1 illustrates an embodiment of a storage environment.

FIG. 1 illustrates an embodiment of a storage environment. A host 100, which may be one of a plurality of connected hosts, may submit Input/Output (I/O) requests to a storage controller 102 over a network 104 to access data at volumes 106 (e.g., Logical Unit Numbers, Logical Devices, Logical Subsystems, etc.) in a storage 108. The volumes 106 may be stored across a plurality of storage devices 110 in a Redundant Array of Independent Disks (RAID) or Just a Bunch of Disk (JBOD) configuration. The storage devices 110 may implement native compression within the controllers of the storage device. The storage devices 110 may implement different compression algorithms and compress data within the storage device at different compression ratios. Data in the volumes 106 may be organized in extents of data, where an extent comprises a range of tracks in the volume or any other grouping of data in a volume. The storage pool of storage devices 110 available to store data in the volumes 106 may include storage device types that provide compression, using different compression algorithms resulting in different compression ratios. and others that do not provide native compression within the storage device.

In an array configuration, such as a RAID array, the storage devices having different compression ratios may be separately organized into separate storage ranks based on the compression ratio of the storage devices, so that each rank has storage device types with similar or same type, such as high compression/low performance or low compression/high performance. Wherein storage devices with different compression algorithms and/or compression ratios may be classified as either low compression/high performance or high compression/low performance for the purpose of being assigned to the corresponding rank. A rank consists of a set of physical storages that are grouped to form a logically contiguous storage space. In RAID, the data is striped across the array of non-compressed or compressed storage devices in the rank. The capacity of the rank may be divided in equal sized portions, called extents. Data in the volumes 106 may be organized in extents of data, where an extent comprises a range of tracks in the volume 106. An extent as that term is used herein may refer to a partition of data in a logical volume 106 or any other grouping of data in a volume or any other storage unit. In alternative embodiments, such as a JBOD embodiments, the storage devices may be organized into different arrays having different compression ratios formed of storage device types having the compression ratio of the array.

The storage controller 102 includes one or more processors 112 and a memory 114, including a cache 116 to cache data for the storage 108. The processors 110 may comprise a separate central processing unit (CPU), one or a group of multiple cores on a single CPU, or a group of processing resources on one or more CPUs. The cache 116 buffers data transferred between the host 100 and volumes 106 in the storage 108.

The memory 114 further includes a storage manager 118 to manage the transfer of tracks between the host 100 and the storage 108 and a cache manager 120 that manages data transferred between host 100 and the storage 108 in the cache 116. A track may comprise any unit of data configured in the storage 108, such as a track, Logical Block Address (LBA), storage cell, group of cells (e.g., column, row or array of cells), sector, segment, etc., which may be part of a larger grouping of tracks, such as a volume, logical device, etc. An extent may comprise any grouping of tracks, such as sequential tracks.

In certain implementations, the storage manager 118 includes an extent manager 122 to manage the storage of extents in the storage devices 110. The extent manager 122 may determine storage devices 110 to store an extent based on attributes of the data in the extent and the native compression ratios and free space in the storage devices 110. The extent manager 122 may maintain compression score information 200 having information used in calculating the compression score for extents, storage device compression information 300 having information on compression at the storage devices, extent information 400 having information on I/O profile of the extents used in calculating a compression score for extents.

In certain embodiments, the storage controller 102 may comprise an enterprise storage controller, such as the International Business Machines Corporation (IBM®) DS8000™ storage controller or storage controllers from other vendors. The host 100 may comprise an enterprise host system that includes an operating system such as, but not limited to, the IBM® Z/OS® operating system. (IBM, Z/OS and DS800 are registered trademarks of IBM throughout the world).

The storage manager 118, cache manager 120, and extent manager 122 may comprise program code loaded into the memory 114 and executed by one or more of the processors 112. Alternatively, some or all of the functions may be implemented as microcode or firmware in hardware devices in the storage controller 102, such as in Application Specific Integrated Circuits (ASICs) and Field Programmable Gate Array (FPGA).

The storage 108 may comprise one or more storage devices 110, such as a solid state storage device (SSD) comprised of solid state electronics, NAND storage cells, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices 110 may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

In described embodiments, a plurality of the storage devices 110 implement native compression within the controller of the storage device 110 to compress data as it is written to the storage media in the storage device 110 and decompress data as it is read from the storage media in the storage device 110. Further, a storage pool of storage devices 110 may include storage device types that offer compression using different compression algorithms and at different compression ratios, as well as do not offer compression.

The memory 114 may comprise a suitable volatile or non-volatile memory devices, including those described above.

The network 104 may comprise a Storage Area Network (SAN), a Local Area Network (LAN), a Wide Area Network (WAN), the Internet, and Intranet, etc.

Figure 2:
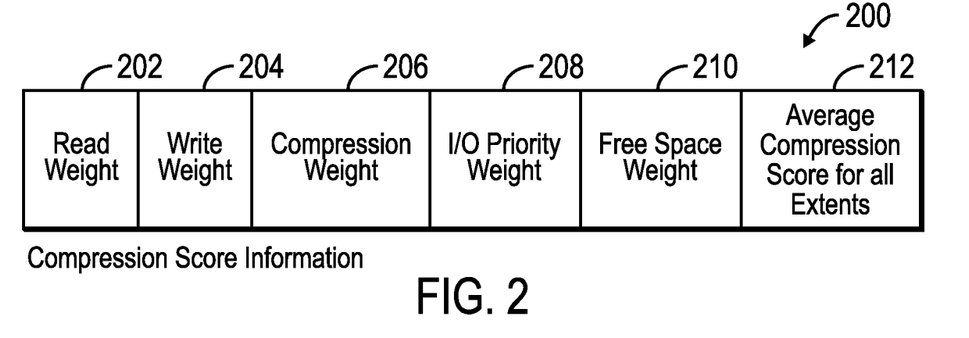
FIG. 2 illustrates an embodiment of compression score information.

FIG. 2 illustrates an embodiment of an instance of compression score information 200 used by the extent manager 122 to calculate the compression score for an extent, including: a read weight 202 to apply to the read frequency component of the compression score; a write weight 204 to apply to the write frequency component of the compression score; a compression weight 206 to apply to the compression component of the compression score; I/O priority 208 weight to apply to the I/O priority component of the compression score; a free space weight 210 to apply to the free space component of the compression score; and an average compression score for all extents 212. The weights 202, 204, 206, 208, 210 may be set by a user based on their preference for relative weights of the component values used in calculating the score components.

Figure 3:
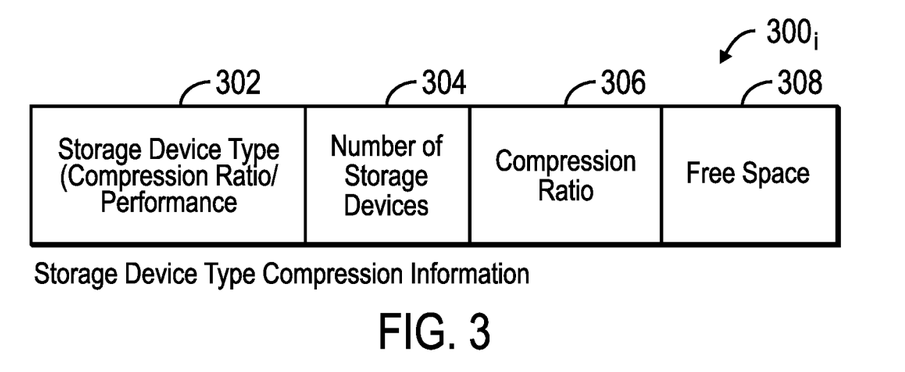
FIG. 3 illustrates an embodiment of storage device compression information.

FIG. 3 illustrates an embodiment of an instance of storage device compression information 300; for different storage device types, where a storage type is defined based on whether the drive is high compression/low performance or it is low compression/high performance. Storage devices, including heterogeneous storage devices, may be grouped into a storage device type based on the compression profile of the storage device type. A storage device having a low compression ratio has higher performance because compressing and decompressing data consumes substantial computing resources and causes latency. A storage device having a relatively high compression ratio has lower performance due to the resources and time to compress and decompress data within the storage device. Storage devices may be assigned a type of high compression/low performance or low compression/high performance storage device type based on their compression algorithm and/or compression ratio relative to the compression algorithm and/or compression ratio of other storage devices in the system. The storage device compression information 300; includes a storage device type 302, e.g., high compression/low performance or low compression/high performance relative to other storage device types offering compression in the system; a number of storage devices 304 of the storage device type 302; a compression ratio 306 for the storage device type 302, which may comprise a range or average if storage devices offering similar compression ratios are grouped in a single storage device type; and free space 308 in all the storage devices of the storage device type 302.

Figure 4:
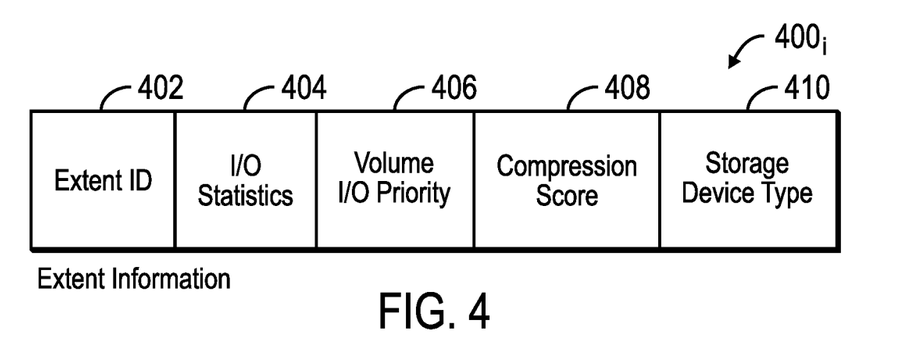
FIG. 4 illustrates an embodiment of extent information on an extent.

FIG. 4 illustrates an embodiment of an instance of extent information 400; for an extent configured in the volumes 106, and includes: an extent identifier (ID) 402; I/O statistics 404 for the extent, including number of writes to the extent for a time interval, number of reads to the extent, etc.; a volume I/O priority 406 indicating a volume I/O priority level for the volume 106 including the extent 402; a compression score 408 last calculated for the extent 402; and the storage device type 410, e.g., high compression/low performance or low compression/high performance, on which the extent 402 is stored.

Figure 5A:
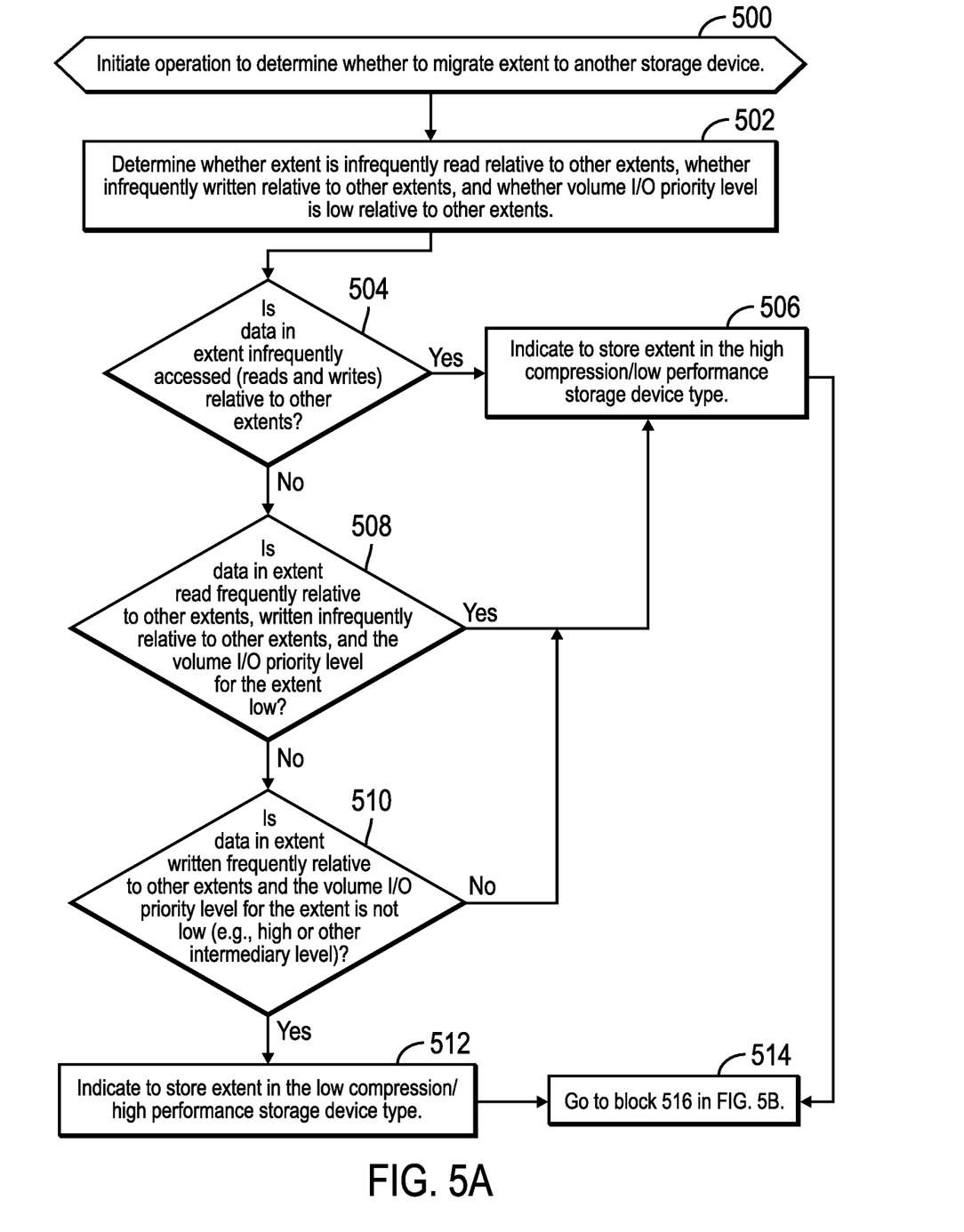
FIGS. 5A, 5B, 6, and 7 illustrate different embodiments of operations to select a storage device type to store an extent.
Figure 5B:
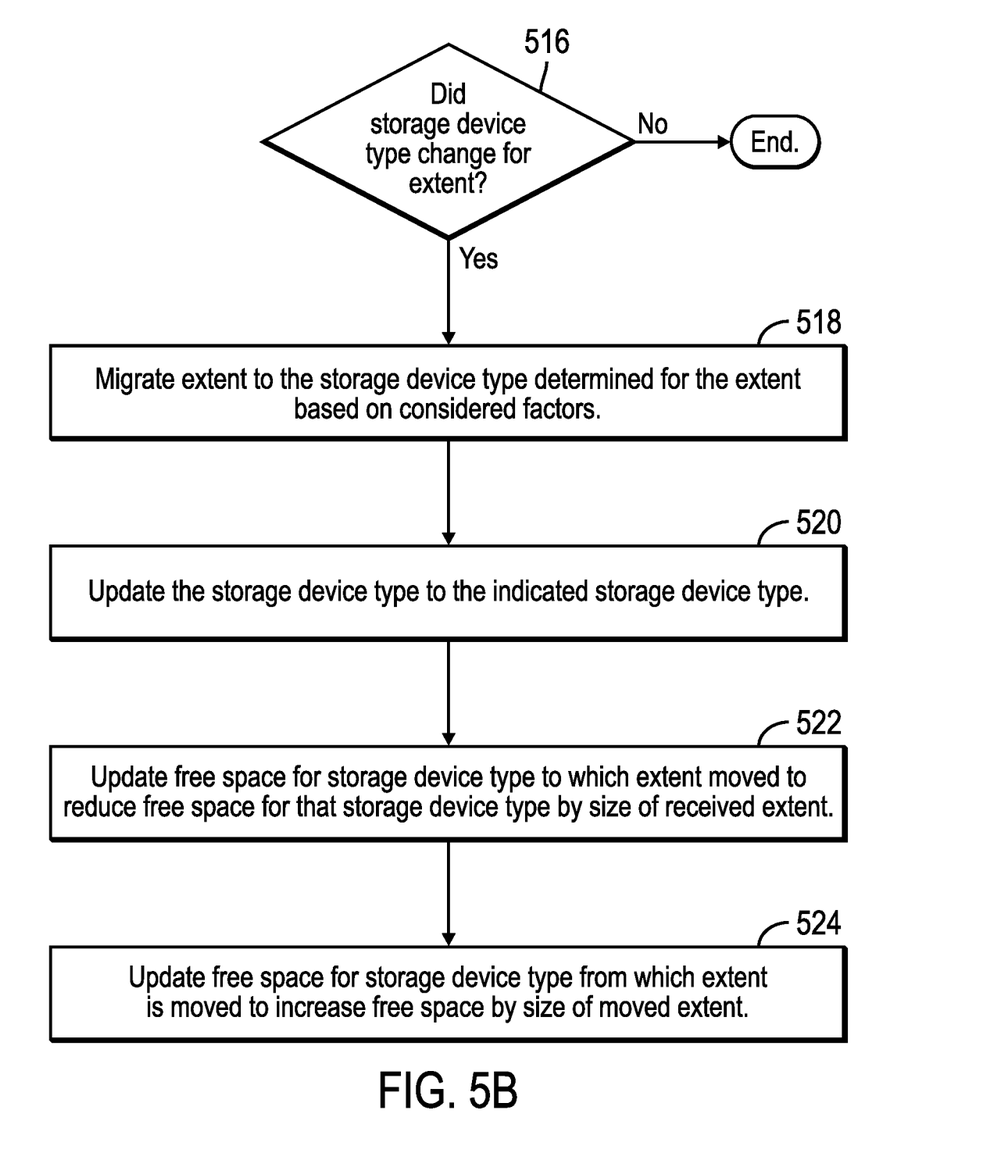

FIGS. 5A and 5B illustrate an embodiment of operations performed by the extent manager 122 to determine whether to migrate an extent to a different storage device type, e.g., high compression/low performance or low compression/high performance based on usage and priority of the extent. With respect to FIG. 5A, upon initiating (at block 500) to determine whether to migrate extent to another storage device 110, the extent manager 122 determines (at block 502), from the I/O statistics 404 and volume I/O priority 406 in the extent information 400; for the extent being considered and other extents, whether the extent is infrequently read relative to other extents, whether the extent is infrequently written relative to other extents, and whether volume I/O priority level is low relative to other extents. If (at block 504) data in the extent is infrequently accessed (reads and writes) relative to other extents, then the extent may be indicated to store (at block 506) in a high compression/low performance storage device type. For instance, because data is infrequently accessed, there will not be a performance lag in the system if the infrequently accessed data needs to be decompressed and compressed. If (at block 504) the data is not infrequently accessed relative to other extents and if (at block 508) the data in the extent is read frequently relative to other extents, written infrequently relative to other extents, and the volume I/O priority level for the extent is low, then the extent may still be indicated (at block 506) to store in the high compression/low performance storage device type because decompression to read is faster than compression to write, and the I/O priority level is low so the data may reside on a high compression/low performance storage device type.

If (at block 508) either the extent is not read frequently, the extent is written frequently or the volume I/O priority level is high, then a determination is made (at block 510) whether data in the extent is written frequently relative to other extents and the volume I/O priority level is not low, such as high. If so, then indication is made (at block 512) to store the extent in the low compression/high performance storage device type. If (at block 510) the data in the extent is not written frequently or the volume I/O priority level is low, then control proceeds to block 506 to indicate to use the high compression/low performance storage device type. After indicating the storage device type at block 506 or 512, control proceeds (at block 514) to block 516 in FIG. 5B.

If (at block 516) the storage device type has changed for the extent, then the extent is migrated (at block 518) to the storage device type determined for the extent based on the considered factors, e.g., relative frequency of data access and relative I/O priority level. Alternatively, the extent may be migrated to a rank of storage devices of the storage device type determined for the extent. The storage device type 410 in the extent information 400; for the extent is updated (at block 520) to indicate the new determined storage device type. The free space 308 for the storage device type 302 in the storage device compression information 300; to which the extent is moved is updated (at block 522) to reduce the free space 308 by the size of the received extent. The free space 308 for the storage device type from which the extent is moved is updated (at block 524) to increase the free space 308 by the size of the moved extent. If (at block 516) the storage device type did not change, control ends.

With the embodiment of FIGS. 5A and 5B, the extent is stored on a storage device type, or a rank of the storage device type, suitable for the data access frequency of the extent and the I/O priority of the extent. The greater the degree to which data is more frequently accessed and has a higher I/O priority level, then the extent may be stored on a storage device type (or rank of the storage device type) of low compression/high performance because performance is more important for such extents frequently accessed extents. However, the degree to which data is less frequently accessed relative to other extents and I/O priority level is lower, then the extent may be stored on a storage device type (or rank of the storage device type) of high compression/low performance because performance is not critical for I/O operations for this extent, so space conservation goal can be achieved.

Figure 6:
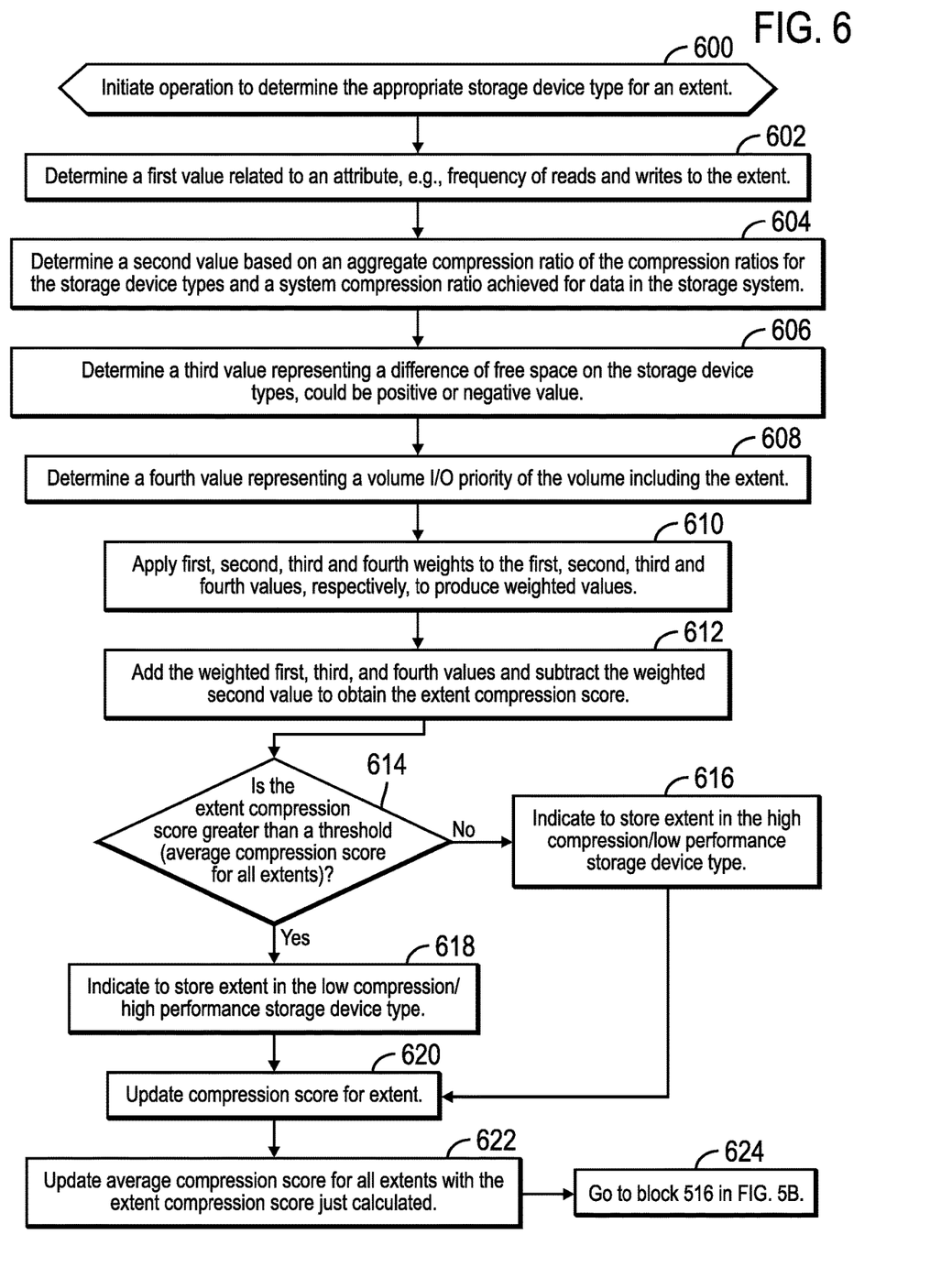

FIG. 6 illustrates an alternative embodiment for the extent manager 122 to determine a storage device type for an extent by calculating a compression score. Upon initiating (at block 600) an operation to determine the appropriate storage device type for an extent, the extent manager 122 determines (at block 602) a first value related to an attribute, e.g., frequency, of reads and writes to the extent, as determined from the I/O statistics 404 for the extent 400$j$. The extent manager 122 further determines (at block 604) a second value based on an aggregate compression ratio of the compression ratios 306 for the storage device types and a system compression ratio achieved for data in the storage system, such as the compression ratio achieved for data stored in all the volumes 106. The extent manager 122 determines (at block 606) a third value representing a difference of free space 308 on the storage device types, which could be positive or negative value. For instance the difference may comprise a difference of the free space 308 on the low compression/high performance storage device type and the free space 308 on the high compression/low performance storage device type when there are two storage device types. The extent manager 122 determines (at block 608) a fourth value representing a volume I/O priority 406 of the volume 106 including the extent in the extent information 400$_i$.

The extent manager 122 applies (at block 610) the first 202, 204, second 206, third 208, and fourth 210 weights to the first, second, third and fourth values, respectively, to produce weighted values. The first value described relates to reads and writes, and thus the read 202 and write 204 weights would be applicable to the read and write frequency components of the first value. The extent manager 122 adds (at block 612) the weighted first, third, and fourth values and subtracts the weighted second value (compression ratio component) to obtain the extent compression score.

If (at block 614) the extent compression score is less than a threshold, such as the average compression score for all extents 212, then indication is made (at block 616) to use the high compression/low performance storage device type. If (at block 614) the extent compression score is greater than a threshold, such as the average compression score for all extents 212, then indication is made (at block 618) to use the low compression/high performance storage device type. The factors that tend to increase the compression score favor selection of a low compression/high performance storage device type, such as greater frequency of read and write access, higher aggregate storage device compression ratio to storage system as whole, more free space in the low compression/high performance storage device type than the high compression/low performance storage device type, which results in the difference being positive and higher, and a higher volume I/O priority. The factors that tend to lower the compression score favor selection of the high compression/low performance storage device type, such as lower frequency of read and write access, lower aggregate storage device compression ratio to storage system as whole, more free space in the high compression/low performance storage device type than the low compression/high performance storage device type, which results in the difference being negative, and a lower volume I/O priority.

After indicating which storage device type to use, from block 616 or 618, the extent manager 122 updates (at block 620) the compression score 408 in the extent information 400; for the extent being considered and updates (at block 622) the average compression score for all extents 212 with the extent compression score just calculated. Control then proceeds (at block 624) to block 516 in FIG. 5B to determine whether the extent needs to be migrated to the new storage device type indicated for the extent based on the updated extent compression score.

With the embodiment of FIG. 6, a compression score is calculated based on factors related to preferring selection of a low compression/high performance storage device type versus a high compression/low performance storage device to indicate which storage device type should be used for the extent to optimize operations with respect to the I/O profile for that extent, as well as consider factors related to the storage device type, including an aggregate or average compression ratio of the storage device types to the compression ratio in the system as a whole and free space different between the different storage device types.

In described embodiments two different storage device types are discussed, low compression/high performance versus high compression/low performance. In further embodiments, there may be additional storage device types, such as medium compression/medium performance and further gradations in between if there are two more different storage device types providing different compression algorithms and compression ratios.

Figure 7:
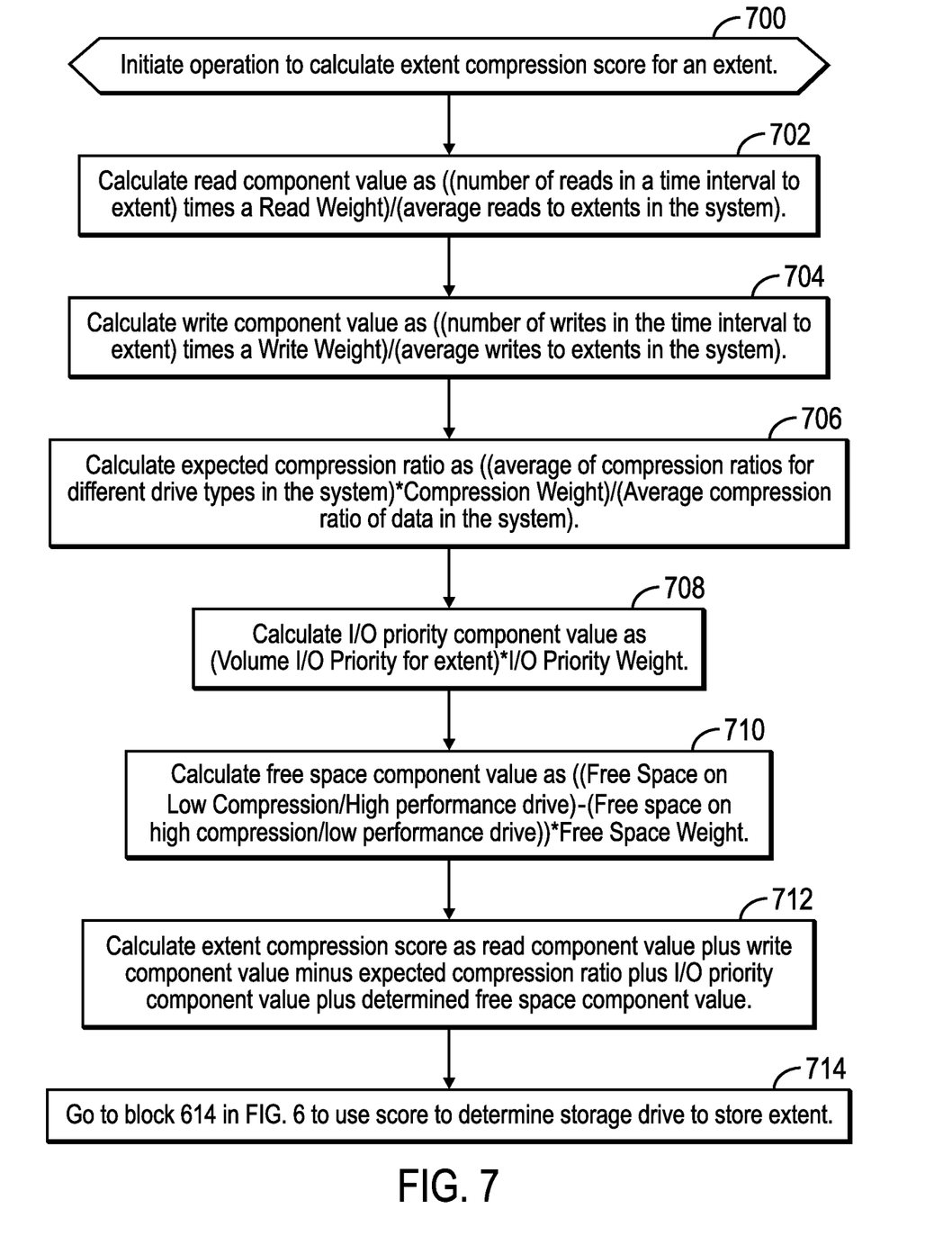

FIG. 7 illustrates a further alternative embodiment for the extent manager 122 to determine a storage device type for an extent by calculating a compression score. Upon initiating (at block 700) an operation to determine the appropriate storage device type for an extent, the extent manager 122 calculates (at block 702) a read component value as ((number of reads in a time interval to extent) times a Read Weight)/(average reads to extents in the system). The number of reads in a time interval may be obtained from the I/O statistics 404 in the extent information 400; for the extent being considered and the "Read Weight" may comprise the read weight 202 in the compression score information 200. The extent manager 122 calculates (at block 704) a write component value as ((number of writes in the time interval to extent) times a Write Weight)/(average writes to extents in the system). The number of writes in a time interval may be obtained from the I/O statistics 404 in the extent information 400; for the extent being considered and the "Write Weight" may comprise the write weight 204 in the compression score information 200. The extent manager 122 calculates (at block 706) an expected compression ratio as ((average of compression ratios for different drive types in the system) *Compression Weight)/(Average compression ratio of data in the system). The average of the compression ratios may comprise the average of the compression ratio 306 in the storage device compression information 300; for the different storage device types. The average compression ratio in the system may be determined from storage controller 102 gathered information, and the Compression Weight comprises the compression weight 206 in the compression score information 200.

The extent manager 122 calculates (at block 708) the I/O priority component value as (Volume I/O Priority for extent) *I/O Priority Weight. The Volume I/O Priority for the extent may comprise the volume I/O Priority 406 indicated in the extent information 400; for the extent, which is an I/O priority for the volume 106 including the extent being considered. The extent manager 122 calculates (at block 710) the free space component value as ((Free Space on Low Compression/High performance drive)–(Free space on high compression/low performance drive))*Free Space Weight. The free space for the different storage device types may be determined from the free space 308 field in the storage device compression information 300; for the different storage device types and the Free Space Weight may comprise the free space weight 210 in the compression score information 200. The extent manager 122 may then calculate (at block 712) the extent compression score as the previously calculated read component value plus write component value minus expected compression ratio plus I/O priority component value plus determined free space component value. Control then proceeds to block 614 in FIG. 6 to use the compression score to determine the storage device type to store the extent.

In the above embodiments, heuristic algorithms are used to calculate a compression score and then determine how to use the compression score to determine the storage device type to store the extent. In an alternative embodiment, the extent manager 122 may comprise a machine learning model, utilizing machine learning algorithms, that receives as input frequency of reads and writes to the extents, compression ratios for the different storage device types, volume I/O priority for volume including the extent and free space for the different storage device types and then outputs a classification of a storage device type to use for the extent.

The extent manager 122 may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained to generate indication of a storage device type on which to store the extent using backward propagation to adjust weights and biases at nodes in a hidden layer to produce their output based on the received inputs. In backward propagation used to train a neural network machine learning module, biases at nodes in the hidden layer are adjusted accordingly to produce the indication of the storage device type for an extent having specified confidence levels based on the input parameters. For instance, the input to the machine learning model may comprise frequency of reads and writes to the extents, compression ratios for the different storage device types, volume I/O priority for volume including the extent and free space for the different storage device types and the machine learning model may produce a classification of a storage device type with confidence levels based on the inputs. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between actual and predicted values for different parameters. The parameters are continually adjusted during gradient descent to minimize the error.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 8:
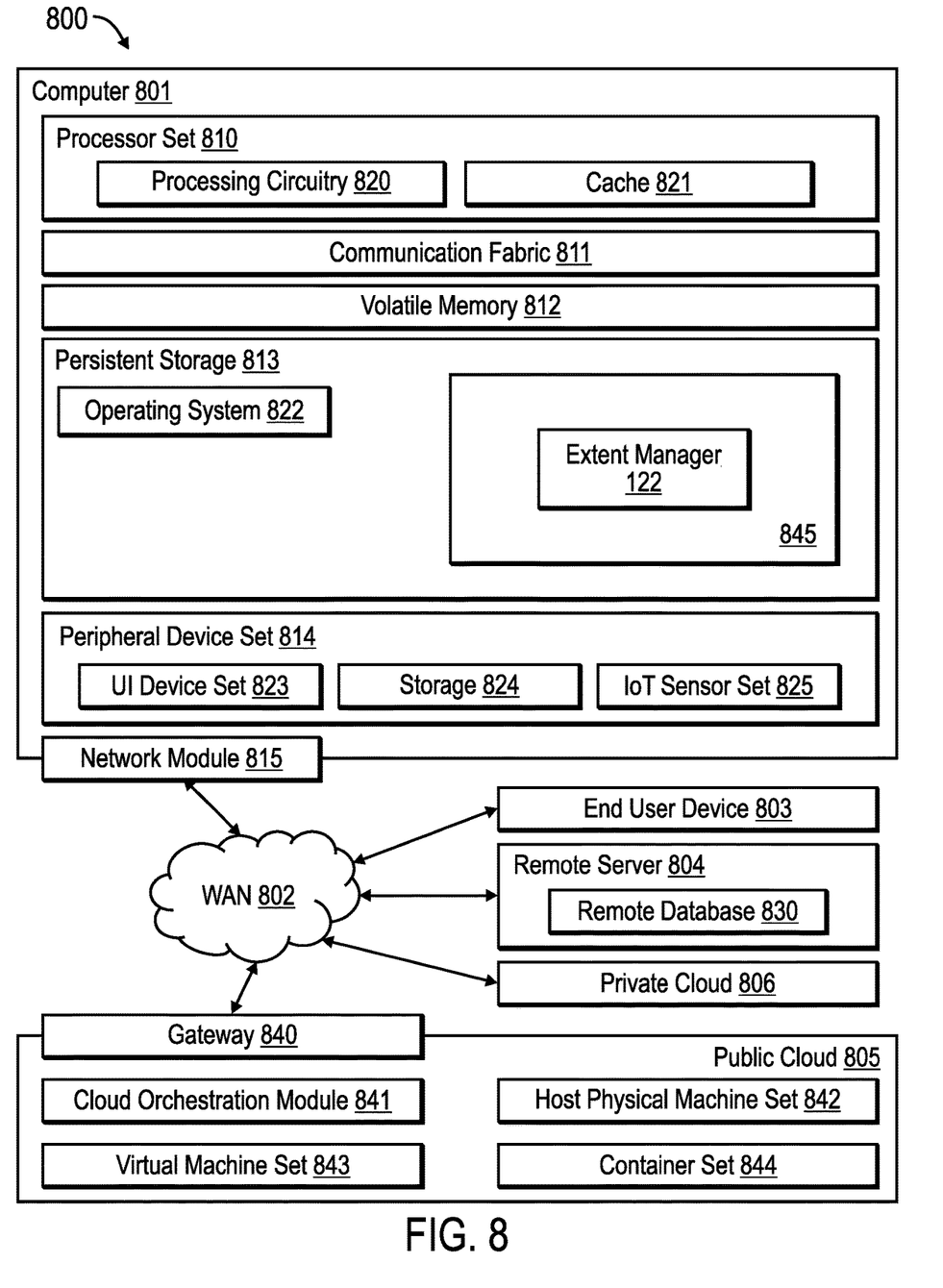
FIG. 8 illustrates a computing environment in which the components of FIG. 1 may be implemented.

With respect to FIG. 8, computing environment 800 contains an example of an environment for the execution of at least some of the computer code involved in performing the inventive methods, including the extent manager 122, described with respect to FIG. 1 above, to select a storage device type to store an extent in block 845. In addition to block 845, computing environment 800 includes, for example, computer 801, wide area network (WAN) 802, end user device (EUD) 803, remote server 804, public cloud 805, and private cloud 806. In this embodiment, computer 801 includes processor set 810 (including processing circuitry 820 and cache 821), communication fabric 811, volatile memory 812, persistent storage 813 (including operating system 822 and block 845, as identified above), peripheral device set 814 (including user interface (UI) device set 823, storage 824, and Internet of Things (IoT) sensor set 825), and network module 815. Remote server 804 includes remote database 830. Public cloud 805 includes gateway 840, cloud orchestration module 841, host physical machine set 842, virtual machine set 843, and container set 844.

COMPUTER 801 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 830. As is well understood in the art of computer technology, and depending upon the technology, performance of a computer-implemented method may be distributed among multiple computers and/or between multiple locations. On the other hand, in this presentation of computing environment 800, detailed discussion is focused on a single computer, specifically computer 801, to keep the presentation as simple as possible. Computer 801 may be located in a cloud, even though it is not shown in a cloud in FIG. 8. On the other hand, computer 801 is not required to be in a cloud except to any extent as may be affirmatively indicated.

PROCESSOR SET 810 includes one, or more, computer processors of any type now known or to be developed in the future. Processing circuitry 820 may be distributed over multiple packages, for example, multiple, coordinated integrated circuit chips. Processing circuitry 820 may implement multiple processor threads and/or multiple processor cores. Cache 821 is memory that is located in the processor chip package(s) and is typically used for data or code that should be available for rapid access by the threads or cores running on processor set 810. Cache memories are typically organized into multiple levels depending upon relative proximity to the processing circuitry. Alternatively, some, or all, of the cache for the processor set may be located "off chip." In some computing environments, processor set 810 may be designed for working with qubits and performing quantum computing.

Computer readable program instructions are typically loaded onto computer 801 to cause a series of operational steps to be performed by processor set 810 of computer 801 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 821 and the other storage media discussed below. The program instructions, and associated data, are accessed by processor set 810 to control and direct performance of the inventive methods. In computing environment 800, at least some of the instructions for performing the inventive methods may be stored in block 845 in persistent storage 813.

COMMUNICATION FABRIC 811 is the signal conduction path that allows the various components of computer 801 to communicate with each other. Typically, this fabric is made of switches and electrically conductive paths, such as the switches and electrically conductive paths that make up buses, bridges, physical input/output ports and the like.

Other types of signal communication paths may be used, such as fiber optic communication paths and/or wireless communication paths.

VOLATILE MEMORY 812 is any type of volatile memory now known or to be developed in the future. Examples include dynamic type random access memory (RAM) or static type RAM. Typically, volatile memory 812 is characterized by random access, but this is not required unless affirmatively indicated. In computer 801, the volatile memory 812 is located in a single package and is internal to computer 801, but, alternatively or additionally, the volatile memory may be distributed over multiple packages and/or located externally with respect to computer 801.

PERSISTENT STORAGE 813 is any form of non-volatile storage for computers that is now known or to be developed in the future. The non-volatility of this storage means that the stored data is maintained regardless of whether power is being supplied to computer 801 and/or directly to persistent storage 813. Persistent storage 813 may be a read only memory (ROM), but typically at least a portion of the persistent storage allows writing of data, deletion of data and re-writing of data. Some familiar forms of persistent storage include magnetic disks and solid state storage devices. Operating system 822 may take several forms, such as various known proprietary operating systems or open source Portable Operating System Interface-type operating systems that employ a kernel. The code included in block 845 typically includes at least some of the computer code involved in performing the inventive methods.

PERIPHERAL DEVICE SET 814 includes the set of peripheral devices of computer 801. Data communication connections between the peripheral devices and the other components of computer 801 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 823 may include components such as a display screen, speaker, microphone, wearable devices (such as goggles and smart watches), keyboard, mouse, printer, touchpad, game controllers, and haptic devices. Storage 824 is external storage, such as an external hard drive, or insertable storage, such as an SD card. Storage 824 may be persistent and/or volatile. In some embodiments, storage 824 may take the form of a quantum computing storage device for storing data in the form of qubits. In embodiments where computer 801 is required to have a large amount of storage (for example, where computer 801 locally stores and manages a large database) then this storage may be provided by peripheral storage devices designed for storing very large amounts of data, such as a storage area network (SAN) that is shared by multiple, geographically distributed computers. IoT sensor set 825 is made up of sensors that can be used in Internet of Things applications. For example, one sensor may be a thermometer and another sensor may be a motion detector.

NETWORK MODULE 815 is the collection of computer software, hardware, and firmware that allows computer 801 to communicate with other computers through WAN 802. Network module 815 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 815 are performed on the same physical hardware device. In other embodiments (for example, embodiments that utilize software-defined networking (SDN)), the control functions and the forwarding functions of network module 815 are performed on physically separate devices, such that the control functions manage several different network hardware devices. Computer readable program instructions for performing the inventive methods can typically be downloaded to computer 801 from an external computer or external storage device through a network adapter card or network interface included in network module 815.

WAN 802 is any wide area network (for example, the internet) capable of communicating computer data over non-local distances by any technology for communicating computer data, now known or to be developed in the future. In some embodiments, the WAN 802 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 803 is any computer system that is used and controlled by an end user (for example, a customer of an enterprise that operates computer 801), and may take any of the forms discussed above in connection with computer 801. EUD 803 typically receives helpful and useful data from the operations of computer 801. For example, in a hypothetical case where computer 801 is designed to provide a recommendation to an end user, this recommendation would typically be communicated from network module 815 of computer 801 through WAN 802 to EUD 803. In this way, EUD 803 can display, or otherwise present, the recommendation to an end user. In some embodiments, EUD 803 may be a client device, such as thin client, heavy client, mainframe computer, desktop computer and so on. The hosts 100 of FIG. 1 may comprise the EUD 803.

REMOTE SERVER 804 is any computer system that serves at least some data and/or functionality to computer 801. Remote server 804 may be controlled and used by the same entity that operates computer 801. Remote server 804 represents the machine(s) that collect and store helpful and useful data for use by other computers, such as computer 801. For example, in a hypothetical case where computer 801 is designed and programmed to provide a recommendation based on historical data, then this historical data may be provided to computer 801 from remote database 830 of remote server 804.

PUBLIC CLOUD 805 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 805 is performed by the computer hardware and/or software of cloud orchestration module 841. The computing resources provided by public cloud 805 are typically implemented by virtual computing environments that run on various computers making up the computers of host physical machine set 842, which is the universe of physical computers in and/or available to public cloud 805.

The virtual computing environments (VCEs) typically take the form of virtual machines from virtual machine set 843 and/or containers from container set 844. It is understood that these VCEs may be stored as images and may be transferred among and between the various physical machine hosts, either as images or after instantiation of the VCE. Cloud orchestration module 841 manages the transfer and storage of images, deploys new instantiations of VCEs and manages active instantiations of VCE deployments. Gateway 840 is the collection of computer software, hardware, and firmware that allows public cloud 805 to communicate through WAN 802.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 806 is similar to public cloud 805, except that the computing resources are only available for use by a single enterprise. While private cloud 806 is depicted as being in communication with WAN 802, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 805 and private cloud 806 are both part of a larger hybrid cloud.

The letter designators, such as i, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for selecting a storage device to store an extent of data in a storage system, the computer program product comprising a computer readable storage medium having computer readable program code embodied therein that when executed performs:

providing, in the storage system, a first storage device type that has data compression at a first compression ratio and a second storage device type that has data compression at a second compression ratio, wherein the second compression ratio is higher than the first compression ratio;

calculating a compression score based i) on an access frequency to the data in the extent and ii) on an Input/Output (I/O) priority level for the extent;

determining, for an extent, to store the extent on the first storage device type or the second storage device type based on the compression score; and storing the extent on the determined first or second storage device type.

2. The computer program product of claim 1, wherein the determining to store the extent on the first storage device type or the second storage device type based on the compression score comprises:

comparing the compression score to a threshold;

storing the extent in the first storage device type in response to the compression score being greater than the threshold; and storing the extent in the second storage device type in response to the compression score being less than the threshold.

3. The computer program product of claim 2, wherein the threshold comprises an average compression score of compression scores calculated for extents in the storage system.

4. The computer program product of claim 1, wherein the calculating the compression score comprises:
adding, to the compression score, i) a number of reads to the extent in a time interval divided by an average number of reads in the storage system and ii) a number of writes to the extent in the time interval divided by an average number of writes in the storage system.

5. The computer program product of claim 1, wherein the calculating the compression score further comprises:
subtracting, from the compression score, an aggregate compression ratio of compression ratios of the first and the second storage device types divided by a system compression ratio achieved for data in the storage system.

6. The computer program product of claim 1, wherein the calculating the compression score further comprises:
adding a difference of i) free space on storage devices of the first storage device type and ii) free space on storage devices of the second storage device type, wherein the difference is positive in response to the first storage device type having more free space than the second storage device type and wherein the difference is negative in response to the second storage device type having more free space than the first storage device type.

7. The computer program product of claim 1, further comprising:
applying adjustable weights, to component values added and subtracted from the compression score, indicative of a relative importance of the component values added and subtracted from the compression score.

8. A system for selecting a storage device to store an extent of data comprising:
a processor; and
a computer readable storage medium having computer readable program code embodied therein that when executed by the processor performs operations, the operations comprising:
providing, in the system, a first storage device type that has data compression at a first compression ratio and a second storage device type that has data compression at a second compression ratio, wherein the second compression ratio is higher than the first compression ratio;
calculating a compression score based on i) an access frequency to the data in the extent and ii) on an Input/Output (I/O) priority level for the extent;
determining, for an extent, to store the extent on the first storage device type or the second storage device type based on the compression score; and
storing the extent on the determined first or second storage device type.

9. The system of claim 8, wherein the determining to store the extent on the first storage device type or the second storage device type based on the compression score comprises:
comparing the compression score to a threshold;
storing the extent in the first storage device type in response to the compression score being greater than the threshold; and
storing the extent in the second storage device type in response to the compression score being less than the threshold.

10. The system of claim 8, wherein the calculating the compression score comprises:
adding, to the compression score, i) a number of reads to the extent in a time interval divided by an average number of reads in the system and ii) a number of writes to the extent in the time interval divided by an average number of writes in the system.

11. The system of claim 8, wherein the calculating the compression score further comprises:
subtracting, from the compression score, an aggregate compression ratio of compression ratios of the first and the second storage device types divided by a system compression ratio achieved for data in the system.

12. The system of claim 8, wherein the calculating the compression score further comprises:
adding a difference of i) free space on storage devices of the first storage device type and ii) free space on storage devices of the second storage device type, wherein the difference is positive in response to the first storage device type having more free space than the second storage device type and wherein the difference is negative in response to the second storage device type having more free space than the first storage device type.

13. The system of claim 8, further comprising:
applying user adjustable weights, to component values added and subtracted from the compression score, indicative of a relative importance of the component values added and subtracted from the compression score.

14. The system of claim 9, wherein the threshold comprises an average compression score of compression scores calculated for extents in a storage system.

15. A method for selecting a storage device to store an extent of data in a storage system, comprising:
providing, in the storage system, a first storage device type that has data compression at a first compression ratio and a second storage device type that has data compression at a second compression ratio, wherein the second compression ratio is higher than the first compression ratio;
calculating a compression score based i) on an access frequency to the data in the extent and ii) on an Input/Output (I/O) priority level for the extent;
determining, for an extent, to store the extent on the first storage device type or the second storage device type based on the compression score; and
storing the extent on the determined first or second storage device type.

16. The method of claim 15, wherein the determining to store the extent on the first storage device type or the second storage device type based on the compression score comprises:
comparing the compression score to a threshold;
storing the extent in the first storage device type in response to the compression score being greater than the threshold; and
storing the extent in the second storage device type in response to the compression score being less than the threshold.

17. The method of claim 15, wherein the calculating the compression score comprises:
adding, to the compression score, i) a number of reads to the extent in a time interval divided by an average number of reads in the storage system and ii) a number of writes to the extent in the time interval divided by an average number of writes in the storage system.

18. The method of claim 15, wherein the calculating the compression score further comprises:
- subtracting, from the compression score, an aggregate compression ratio of compression ratios of the first and the second storage device types divided by a system compression ratio achieved for data in the storage system.

19. The method of claim 15, further comprising:
- applying user adjustable weights, to component values added and subtracted from the compression score, indicative of a relative importance of the component values added and subtracted from the compression score.

20. The method of claim 16, wherein the threshold comprises an average compression score of compression scores calculated for extents in a storage system.

* * * * *